United States Patent
Lutz et al.

(10) Patent No.: US 10,888,837 B2
(45) Date of Patent: Jan. 12, 2021

(54) ZEOLITE ADSORBENTS HAVING A HIGH EXTERNAL SURFACE AREA AND USES THEREOF

(71) Applicant: ARKEMA FRANCE, Colombes (FR)

(72) Inventors: Cécile Lutz, Gan (FR); Ludivine Bouvier, Orthez (FR); Serge Nicolas, Lons (FR); Jullian Vittenet, Orthez (FR); Sylvie Szendrovics, Arthez-de-bearn (FR); Quitterie Persillon, Morlaas (FR)

(73) Assignee: Arkema France, Colombes (FR)

( * ) Notice: Subject to any disclaimer, the term of this patent is extended or adjusted under 35 U.S.C. 154(b) by 424 days.

(21) Appl. No.: 15/546,847

(22) PCT Filed: Jan. 29, 2016

(86) PCT No.: PCT/FR2016/050197
§ 371 (c)(1),
(2) Date: Jul. 27, 2017

(87) PCT Pub. No.: WO2016/124842
PCT Pub. Date: Aug. 11, 2016

(65) Prior Publication Data
US 2018/0008955 A1 Jan. 11, 2018

(30) Foreign Application Priority Data
Feb. 2, 2015 (FR) ...................... 15 50781

(51) Int. Cl.
*B01J 20/18* (2006.01)
*B01D 53/047* (2006.01)
(Continued)

(52) U.S. Cl.
CPC .............. *B01J 20/18* (2013.01); *B01D 53/02* (2013.01); *B01D 53/047* (2013.01);
(Continued)

(58) Field of Classification Search
CPC .......... B01J 20/18; B01J 20/28; B01D 53/047
See application file for complete search history.

(56) References Cited

U.S. PATENT DOCUMENTS 5,203,887 A * 4/1993 Toussaint ........... B01D 53/0476
96/130
6,328,786 B1 12/2001 Labasque et al.
(Continued)

FOREIGN PATENT DOCUMENTS

EP 0 893 157 A1 1/1999
EP 1 048 345 A1 11/2000
(Continued)

OTHER PUBLICATIONS

Tao et al. (Mesopore-modified zeolites: Preparation, characterization, and applications, Chem. Rev. 2006, 106, 896-910) (Year: 2006).*

(Continued)

*Primary Examiner* — Youngsul Jeong
(74) *Attorney, Agent, or Firm* — RatnerPrestia

(57) ABSTRACT

The present invention concerns the use, for gas separation, of at least one zeolite adsorbent material comprising at least one FAU zeolite, said adsorbent having an external surface area greater than 20 m²·g⁻¹, a non-zeolite phase (PNZ) content such that 0<PNZ≤30%, and an Si/Al atomic ratio of between 1 and 2.5. The invention also concerns a zeolite adsorbent material having an Si/Al ratio such that 1≤Si/Al<2.5, a mesoporous volume of between 0.08 cm³·g⁻¹ and 0.25 cm³·g⁻¹, a (Vmicro–Vmeso)/Vmicro ratio of between −0.5 and 1.0, non-inclusive, and a non-zeolite phase (PNZ) content such that 0<PNZ≤30%.

14 Claims, 3 Drawing Sheets

(51) Int. Cl.
*B01D 53/02* (2006.01)
*B01J 20/28* (2006.01)
*C10L 3/10* (2006.01)
*F25J 3/04* (2006.01)
*B01D 53/04* (2006.01)

(52) U.S. Cl.
CPC ....... B01J 20/186 (2013.01); B01J 20/28057 (2013.01); B01J 20/28059 (2013.01); B01J 20/28069 (2013.01); B01J 20/28071 (2013.01); B01J 20/28088 (2013.01); C10L 3/103 (2013.01); C10L 3/104 (2013.01); F25J 3/04169 (2013.01); *B01D 53/0462* (2013.01); *B01D 53/0473* (2013.01); *B01D 53/0476* (2013.01); *B01D 2253/1085* (2013.01); *B01D 2253/306* (2013.01); *B01D 2253/311* (2013.01); *B01D 2256/12* (2013.01); *B01D 2257/102* (2013.01); *B01D 2257/306* (2013.01); *B01D 2257/504* (2013.01); *B01D 2259/416* (2013.01); *C10L 2290/143* (2013.01); *C10L 2290/542* (2013.01); *F25J 2205/64* (2013.01); *F25J 2220/40* (2013.01); *Y02C 20/40* (2020.08)

(56) References Cited

U.S. PATENT DOCUMENTS

| | | | |
|---|---|---|---|
| 6,423,658 B1 | 7/2002 | Thonnelier et al. | |
| 6,432,171 B1 * | 8/2002 | Kumar | B01D 53/02 95/120 |
| 6,607,584 B2 | 8/2003 | Moreau et al. | |
| 6,652,626 B1 | 11/2003 | Plee | |
| 7,309,378 B2 | 12/2007 | Bancon et al. | |
| 7,785,563 B2 | 8/2010 | Ryoo et al. | |
| 7,825,056 B2 * | 11/2010 | Le Bec | B01D 15/00 502/60 |
| 9,744,519 B2 | 8/2017 | Lutz et al. | |
| 2012/0093715 A1 | 4/2012 | Wang | |
| 2013/0052126 A1 | 2/2013 | Wang | |
| 2013/0216627 A1 | 8/2013 | Galbraith et al. | |
| 2016/0193586 A1 | 7/2016 | Bouvier et al. | |

FOREIGN PATENT DOCUMENTS

| | | | | |
|---|---|---|---|---|
| EP | 1 142 622 A2 | 10/2001 | | |
| EP | 1 205 231 A1 | 5/2002 | | |
| EP | 1 240 939 A2 | 9/2002 | | |
| EP | 1 312 406 A1 | 5/2003 | | |
| EP | 1312406 A1 * | 5/2003 | ............ | B01D 53/04 |
| EP | 1 354 619 A1 | 10/2003 | | |
| FR | 2 794 993 | 12/2000 | | |
| FR | 2 873 307 | 1/2006 | | |
| WO | WO 99/43415 | 9/1999 | | |
| WO | WO 99/43416 | 9/1999 | | |
| WO | WO 99/43418 | 9/1999 | | |
| WO | WO 02/49742 A1 | 6/2002 | | |
| WO | WO 03/004135 A1 | 1/2003 | | |
| WO | WO 2008/051904 A1 | 5/2008 | | |
| WO | WO 2008/109882 A2 | 9/2008 | | |
| WO | WO 2008/152319 A2 | 12/2008 | | |
| WO | WO 2015/019014 A2 | 2/2015 | | |

OTHER PUBLICATIONS

Inayat et al. (Assemblies of mesoporous FAU-type zeolite nanosheets, 2012, Angew. Chem. Int. Ed. vol. 51, pp. 1962-1965) (Year: 2012).*
EP-1312406-A1_English Translation (Year: 2003).*
Alpay et al., Chemical Engineering Science, 49(18):3059-75 (1994).
International Search Report for International Application No. PCT/FR2016/050197 dated Mar. 5, 2016.
Schwieger et al., Angew. Chem. Int. Ed., 51:1962-65 (2012).

* cited by examiner

ZEOLITE ADSORBENTS HAVING A HIGH EXTERNAL SURFACE AREA AND USES THEREOF

CROSS-REFERENCE TO RELATED APPLICATIONS

This patent application is a U.S. National Phase Patent Application of PCT Application No. PCT/FR2016/050197, filed Jan. 29, 2016, which claims priority to French Patent Application No. 1550781, filed Feb. 2, 2015, each of which is incorporated by reference herein in its entirety for all purposes.

FIELD OF THE INVENTION

The invention relates to the use of zeolite adsorbent materials in agglomerated form comprising at least one faujasite zeolite, said adsorbents having a high external surface area characterized by nitrogen adsorption, and a high micropore volume, for gas phase separation, in particular in pressure swing processes, either of PSA (pressure swing adsorption) type, or of VSA (vacuum swing adsorption) type, or of VPSA (hybrid process of the previous two), or of RPSA (rapid pressure swing adsorption) type, in temperature swing processes of TSA (temperature swing adsorption) type and/or in pressure and temperature swing processes of PTSA (pressure and temperature swing adsorption) type.

The present invention also relates to a process for gas separation and purification using said zeolite adsorbents having a high external surface area.

The invention also relates to zeolite adsorbent materials that can be used in the context of the present invention having a high external surface area and comprising lithium and/or calcium and/or sodium.

BACKGROUND OF THE INVENTION

The use of agglomerates of this type is particularly advantageous in applications where the transfer kinetics, the volumetric adsorption capacity, which are determining parameters for the overall efficiency and productivity of the process, and also low pressure drops are desired.

In adsorption separation techniques, a great deal of effort has been given over the past few years to increasing the hourly productivity of the adsorbent beds, in particular by increasing the adsorption/desorption cycle frequency, which means that the adsorbent used, in addition to its thermodynamic adsorption properties, must be able to become saturated by adsorption and to release the adsorbed gas on desorption in increasingly short time periods. The adsorbents must thus be designed so as to have the most efficient mass transfer possible, that is to say such that the gases to be separated or to be purified reach the adsorption sites as rapidly as possible and are also desorbed as rapidly as possible.

Several paths have been explored in order to achieve this objective. The first method proposed by the literature consists in decreasing the size of the adsorbent particles. It is generally accepted that the effect of this is to enable a more rapid diffusion of the gases in the macroporous network, the kinetic constant for transfer of matter being inversely proportional to the square of the diameter of the particles (or equivalent dimension, depending on the morphology of the adsorbents. Mention will for example be made of the article "*Adsorbent particle size effects in the separation of air by rapid pressure swing adsorption*", by E. Alpay et al., *Chemical Engineering Science*, 49(18), 3059-3075, (1994).

Document WO 2008/152319 describes the preparation, by spray-drying, of mechanically strong adsorbents of small sizes, which are for example used in portable concentrators of medical oxygen, as shown by document US 2013/0216627. The main drawback of reducing the size of the adsorbent particles is the increase in the pressure drops in adsorbents and the high energy consumption that is associated therewith. This is particularly unacceptable in industrial gas production adsorption processes.

The second method consists in improving the intragranular transfer capability of the adsorbents, without changing the size thereof. International applications WO 99/43415, WO 99/43416, WO 99/43418, WO 2002/049742 and WO 2003/004135 describe adsorbents with improved kinetics, obtained by conversion of the agglomeration binder into zeolite active matter and also the associated gas separation processes, which are more efficient than with conventional particles.

Document WO 2008/051904 proposes a process for producing, by extrusion/spheronization of beads of zeolite adsorbents based on zeolite LiX with improved diffusion. Document WO 2008/109882 describes, for its part, the preparation of high crush-strength adsorbents with improved mass transfer from LiX or LiLSX zeolites and less than 15% of siliceous binder introduced in colloidal form.

Application EP 1 240 939 proposes selecting, for uses in a PSA or VSA process, adsorbents having a certain ratio between their kinetic transport constants for absorbable compounds in the gas phase and in the solid phase. Document U.S. Pat. No. 6,328,786 defines a minimum threshold of mechanical strength and a kinetic coefficient above which the adsorbents are preferred for use in a PSA process. Application EP 1 048 345 describes high-macroporosity adsorbents produced by means of a spheronization and lyophilization technique.

A third method consists in improving the access to the adsorbent by using various forming geometries combining both reduced active material thicknesses and sufficiently wide fluid passage cross-sections to allow a flow with limited pressure drops. Mention may be made of adsorbent sheets and fabrics, monoliths of bee's nest type, foams or the like.

Document FR 2 794 993 proposes using heterogeneous beads, with an adsorbent of peripheral layer of small thickness coating an inert core: the diffusion distance is thus reduced, without increasing the pressure drops. This system has the defect of having a low volumetric efficiency: a significant part of the adsorber is taken up by matter which is inert in terms of adsorption, which has a considerable impact in terms of facility sizes and thus of investments, or even of weight, which can be bothersome, in the case of portable purification/separation equipment, for instance medical oxygen concentrators.

Patent applications US 2012/0093715 and US 2013/0052126 teach that it is possible to form monolithic zeolite structures with a hierarchical structure, by adding a polymer to the synthesis reaction medium: as for the adsorbent sheets and fabrics, the solids obtained have a very high macropore volume and a very high mesopore volume, these solids are thus not very dense and their volumetric efficiency is low, owing to their low volumetric adsorption capacity.

Thus, all these adsorbent geometries of various natures pose problems in terms of relatively complex processing, of mechanical fatigue or wear resistance and of low volumetric efficiency, since the active matter content is often reduced to the benefit of inert binders or other mechanical reinforcement fibers or since the materials obtained are not very dense.

There thus remains a need for zeolite adsorbents that are of use for the separation and purification of gases having good transfer properties which do not have the drawbacks associated with the use of the prior art adsorbents. In particular, there remains a need for a zeolite adsorbent having greater adsorption capacities and better adsorption/desorption kinetics, allowing in particular a more intensive use of processes, and in particular PSA, TSA or VPSA processes.

SUMMARY OF THE INVENTION

The inventors have now discovered that the abovementioned objectives can be totally or at least partially achieved by virtue of adsorbents specifically devoted to gas separation and purification uses as will be described now.

Thus, and according to a first aspect, the invention relates to the use, for gas separation, of at least one zeolite adsorbent material comprising at least one FAU zeolite, said adsorbent having:

an external surface area, measured by nitrogen adsorption and expressed in m$^2$ per gram of adsorbent greater than 20 m$^2 \cdot$g$^{-1}$, and preferably between 20 m$^2 \cdot$g$^{-1}$ and 300 m$^2 \cdot$g$^{-1}$, and more preferably between 30 m$^2 \cdot$g$^{-1}$ and 250 m$^2 \cdot$g$^{-1}$ and even more preferably between 40 m$^2 \cdot$g$^{-1}$ and 200 m$^2 \cdot$g$^{-1}$, and most particularly between 50 m$^2 \cdot$g$^{-1}$ and 200 m$^2 \cdot$g$^{-1}$, a non-zeolite phase (PNZ) content such that 0<PNZ≤30%, preferably 3%≤PNZ≤25%, more preferably 3%≤PNZ≤20%, advantageously 5%≤PNZ≤20%, even better still 7%≤PNZ≤18%, measured by XRD (X-ray diffraction), by weight relative to the total weight of the adsorbent, a mesopore volume (Vmeso) of between 0.08 cm$^3 \cdot$g$^{-1}$ and 0.25 cm$^3 \cdot$g$^{-1}$, preferably between 0.08 cm$^3 \cdot$g$^{-1}$ and 0.22 cm$^3 \cdot$g$^{-1}$, and more preferably between 0.09 cm$^3 \cdot$g$^{-1}$ and 0.20 cm$^3 \cdot$g$^{-1}$, more preferably between 0.10 cm$^3 \cdot$g$^{-1}$ and 0.20 cm$^3 \cdot$g$^{-1}$, limits included, and an Si/Al atomic ratio of the adsorbent of between 1 and 2.5, preferably between 1 and 2.0, more preferably between 1 and 1.8 and entirely preferably between 1 and 1.6, all of the measurements being carried out on the adsorbent material at least 95% exchanged with sodium.

DETAILED DESCRIPTION OF THE INVENTION

Figure 1:
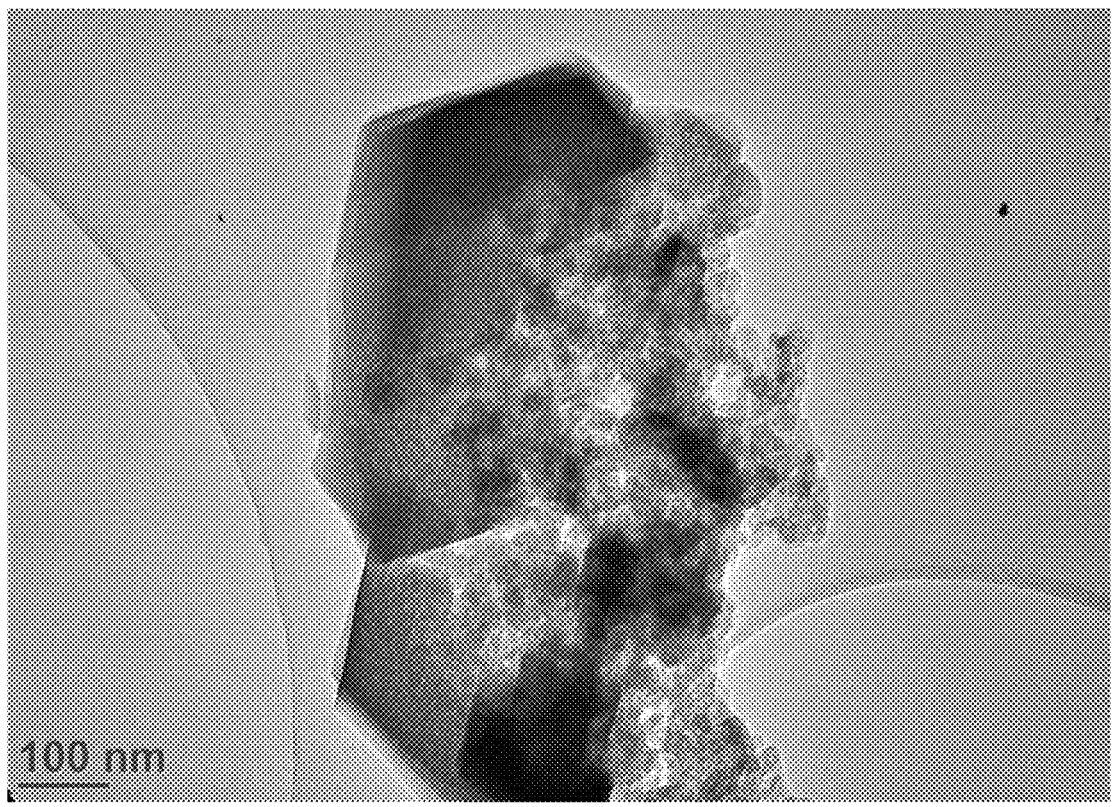
FIG. 1 is a TEM image of an embodiment of the invention.

In the present description, the term "FAU zeolite" denotes a faujasite zeolite, advantageously a mesopore faujasite zeolite chosen from zeolites of LSX, MSX, X and Y type and mixtures thereof. According to one embodiment, the zeolite adsorbent material can also comprise one or more other zeolite(s) chosen from FAU zeolites (LSX, MSX, X, Y), LTA zeolites, CHA zeolites (chabazite), HEU zeolites (clinoptilolite), and mixtures of two or more of them, and more preferably from LSX, MSX and X zeolites, and mixtures of two or more of them.

Other zeolites may be present in minor amounts in the adsorbents of the invention or usable in the process of the invention. These zeolites can be considered to be pollutants, in particular because they do not contribute to gas adsorption, in other words they are inert with respect to gas adsorption. By way of nonlimiting examples, these zeolites comprise sodalite, hydroxysodalite, zeolite P, and other zeolites that are inert with respect to gas adsorption.

The various types of zeolites present in the zeolite adsorbent material are determined by XRD. The amount of zeolites is also measured by XRD and is expressed as % by weight relative to the total weight of the adsorbent material.

Consequently, in the present invention, the term "non-zeolite phase" (or "PNZ") denotes any phase present in the adsorbent material, other than the zeolite(s) defined above, called "zeolite phase" or "PZ". The amount of non-zeolite phase is expressed by the amount to be added to the zeolite phase of the adsorbent to make the total up to 100%, in other words:

$$\% \, PNZ = 100 - \% \, PZ,$$

where % PNZ represents the percentage by weight of PNZ and % PZ the percentage by weight of zeolite phase, relative to the total weight of the adsorbent.

The expression "adsorbent at least 95% exchanged with sodium" is intended to mean that at least 95% of the exchangeable catatonic sites of the zeolite phase are taken up by sodium cations.

This zeolite adsorbent material at least 95% exchanged with sodium can be obtained and preferably is obtained according to the following protocol: the zeolite adsorbent material to be exchanged with sodium is introduced into a solution of sodium chloride at 1 mol of NaCl per liter, at 90° C., for 3 hours, with a liquid-to-solid ratio of 10 ml·g$^{-1}$. The operation is repeated n times, n being at least equal to 1, preferably at least equal to 2, preferably at least equal to 3, more preferably at least equal to 4.

The solids resulting from the exchange operations n−1 and n are successively washed four times by immersion in water in a proportion of 20 ml·g$^{-1}$ in order to remove the excess salt, and then dried for 12 hours at 80° C. in air, before being analyzed by X-ray fluorescence. If the weight percentage of sodium oxide of the zeolite adsorbent material, between the exchange operations n−1 and n, is stable at ±1%, said zeolite adsorbent material is considered to be "in its form at least 95% exchanged with sodium". Where appropriate, additional exchanges are carried out as described above until stability of the weight percentage of sodium oxide of ±1% is obtained.

It will in particular be possible to carry out successive batchwise cationic exchanges, with a large excess of sodium chloride, until this weight percentage of sodium oxide of the zeolite adsorbent material, determined by X-ray fluorescence chemical analysis, is stable at ±1%. This method of measurement is explained below in the description. As a variant, the zeolite adsorbent material can already be intrinsically in its sodium-exchanged form after the synthesis step when the latter is carried out exclusively in an alkaline sodium medium.

The Si/Al atomic ratio of the zeolite adsorbent material is measured by X-ray fluorescence elemental chemical analysis, a technique well known to those skilled in the art and explained below in the description. If necessary, the sodium exchange is carried out before analyses according to the procedure described in detail above.

The term "Vmicro" is intended to mean the micropore volume of the zeolite adsorbent material, the measurement technique of which is explained below. The term "Vmeso" is intended to mean the mesopore volume of the zeolite adsorbent material, the measurement technique of which is explained below.

According to one preferred embodiment, said at least one zeolite adsorbent material that can be used in the context of the present invention has a (Vmicro−Vmeso)/Vmicro ratio of between −0.5 and 1.0, limits not included, preferably between −0.1 and 0.9, limits not included, preferably between 0 and 0.9, limits not included, more preferably between 0.2 and 0.8, limits not included, more preferably between 0.4 and 0.8, limits not included, preferably between 0.6 and 0.8, limits not included, where Vmicro is the micropore volume measured by the Dubinin-Raduskevitch method and Vmeso is the mesopore volume determined by the Barrett-Joyner-Halenda (BJH) method, all of the measurements being carried out on the adsorbent material at least 95% exchanged with sodium.

According to yet another embodiment, said at least one zeolite adsorbent material has a micropore volume (Vmicro, or else Dubinin-Raduskevitch volume), expressed in cm³ per gram of adsorbent material, of between 0.210 cm$^3 \cdot$g$^{-1}$ and 0.360 cm$^3 \cdot$g$^{-1}$, preferably between 0.230 cm$^3 \cdot$g$^{-1}$ and 0.350 cm$^3 \cdot$g$^{-1}$, preferably between 0.240 cm$^3 \cdot$g$^{-1}$ and 0.350 cm$^3 \cdot$g$^{-1}$, more preferably 0.250 cm$^3 \cdot$g$^{-1}$ and 0.350 cm$^3 \cdot$g$^{-1}$, measured on the adsorbent material at least 95% exchanged with sodium On the basis of the micropore volume according to Dubinin-Raduskevitch measured on the zeolite adsorbent material exchanged with sodium, it is also possible to calculate an overall Dubinin-Raduskevitch volume of FAU zeolite(s), which is PNZ-weighted.

The total volume of the macropores and mesopores of the zeolite adsorbent materials that can be used in the context of the present invention, measured by mercury intrusion, is advantageously between 0.15 cm$^3 \cdot$g$^{-1}$ and 0.5 cm$^3 \cdot$g$^{-1}$, preferably between 0.20 cm$^3 \cdot$g$^{-1}$ and 0.40 cm$^3 \cdot$g$^{-1}$ and very preferably between 0.20 cm$^3 \cdot$g$^{-1}$ and 0.35 cm$^3 \cdot$g$^{-1}$, the measurements being carried out on the adsorbent material at least 95% by weight exchanged with sodium.

The volume fraction of the macropores of the zeolite adsorbent material that can be used in the context of the present invention is preferably between 0.2 and 1.0 of the total volume of the macropores and mesopores, very preferably between 0.4 and 0.8 and even more preferably between 0.45 and 0.65, limits included, the measurements being carried out on the zeolite adsorbent material at least 95% by weight exchanged with sodium.

The zeolite adsorbent materials that can be used in the context of the present invention are either known or can be prepared using known procedures, or else are novel and in this respect are an integral part of the present invention.

According to yet another preferred embodiment, the use according to the invention employs a zeolite adsorbent material comprising at least one mesoporous FAU zeolite. The term "mesoporous" is intended to mean a zeolite which has, together with the microporosity inherent in the structure of the zeolite, internal cavities of nanometric size (mesoporosity), easily identifiable by observation using a transmission electron microscope (TEM), as described for example in U.S. Pat. No. 7,785,563.

More specifically, said FAU zeolite of the zeolite adsorbent material is a mesoporous FAU zeolite, that is to say a zeolite having an external surface area, defined by the t-plot method described below, of between 40 m$^2 \cdot$g$^{-1}$ and 400 m$^2 \cdot$g$^{-1}$, preferably between 60 m$^2 \cdot$g$^{-1}$ and 200 m$^2 \cdot$g$^{-1}$, limits included. By extension, for the purposes of the present invention, a "non-mesoporous zeolite" is a zeolite optionally having an external surface area, defined by the t-plot method described below, of strictly less than 40 m$^2 \cdot$g$^{-1}$.

In particular, the zeolite adsorbent materials that can be used in the context of the present invention comprise at least one FAU zeolite, said at least one FAU zeolite having an Si/Al ratio corresponding to the inequation 1≤Si/Al<1.5, preferably 1≤Si/Al≤1.4, and more preferably an Si/Al atomic ratio equal to 1.00+/−0.05, said Si/Al ratio being measured by solid silicon 29 nuclear magnetic resonance of ($^{29}$Si NMR), according to the techniques well known to those skilled in the art.

The Si/Al ratio of each of the zeolite(s) present in the adsorbent is also measured by NMR of the solid.

According to one preferred embodiment, the FAU zeolite of the zeolite adsorbent material is in the form of crystals, the number-average diameter of which, measured using a scanning electron microscope (SEM), is less than 20 μm, preferably between 0.1 μm and 20 μm, preferably between 0.1 and 10 μm, preferably between 0.5 μm and 10 μm, more preferably between 0.5 μm and 5 μm, limits included.

According to yet another preferred embodiment, said zeolite adsorbent material comprises at least one cation chosen from the ions of groups IA, IIA, IIIA, IB, IIB and IIIB of the periodic table, the trivalent ions of the lanthanide or rare earth series, the zinc(II) ion, the silver(I) ion, the cupric (II) ion, the chromium(III) ion, the ferric (III) ion, the ammonium ion and/or the hydronium ion, the preferred ions being calcium, lithium, sodium, potassium, barium, cesium, strontium, zinc and rare-earth ions and more preferably sodium, calcium and lithium ions.

According to one embodiment, the zeolite adsorbent material that can be used in the context of the present invention comprises at least one alkali or alkaline-earth metal chosen from sodium, calcium, lithium, and mixtures of two or three of them in any proportions, the contents of which, expressed as oxides, are preferably such that:

the CaO content is between 0% and 20.5% by weight relative to the total weight of the zeolite adsorbent material, preferably between 3% and 20.5% by weight relative to the total weight of the zeolite adsorbent material, preferably between 7.5% and 20.5% by weight relative to the total weight of the zeolite adsorbent material, and preferably between 9% and 20.5% by weight relative to the total weight of the zeolite adsorbent material, limits included, the Li$_2$O content is between 0% and 12% by weight relative to the total weight of the zeolite adsorbent material, preferably between 3% and 12% by weight relative to the total weight of the zeolite adsorbent material, preferably between 5% and 12% by weight relative to the total weight of the zeolite adsorbent material, and preferably between 6.5% and 12% by weight relative to the total weight of the zeolite adsorbent material, limits included, the Na$_2$O content is between 0% and 22% by weight relative to the total weight of the zeolite adsorbent material, preferably between 0% and 19% by weight relative to the total weight of the zeolite adsorbent material, preferably between 0% and 15% by weight relative to the total weight of the zeolite adsorbent material, preferably between 0% and 10% by weight relative to the total weight of the zeolite adsorbent material, and entirely preferably between 0% and 7% by weight relative to the total weight of the zeolite adsorbent material, advantageously between 0% and 2% by weight relative to the total weight of the zeolite adsorbent material, limits included, it being understood that the zeolite adsorbent material comprises at least one of the three metals chosen from lithium, sodium and calcium, said zeolite adsorbent material possibly also comprising at least one rare earth, chosen from lanthanides and actinides, preferably from lanthanides, in a content of generally between 0% and 10%, preferably between 0% and 7%, said zeolite adsorbent material possibly also comprising, in small amounts (% expressed as oxide, less than 5%, preferably less than 2%), one or more cations other than lithium, sodium and calcium, for example and preferably chosen from potassium, barium, strontium, cesium, transition metals such as silver, and the like.

According to the present invention, the zeolite adsorbent materials described above are most particularly useful, suitable and effective in processes for gas-phase separation, in particular in pressure and/or temperature swing processes, either of PSA type, or of VSA type, or of VPSA type, or of RPSA type, or of TSA type and/or in processes of PTSA type.

More specifically, the present invention relates to the use of at least one zeolite adsorbent material comprising at least one FAU zeolite, as defined above, for gas separation. The term "gas separation" is intended to mean purifications, pre-purifications, eliminations, and other separations of one or more gas compounds present in a mixture of one or more gas compounds.

According to one preferred aspect of the present invention, the zeolite adsorbent materials that can be used for the gas purification are materials which only generate a slight pressure drop or pressure drops that are acceptable for the abovementioned uses.

Preference is thus given to the agglomerated and formed zeolite adsorbent materials prepared according to any techniques known to those skilled in the art, such as extrusion, compacting, agglomeration on a granulating plate or granulating drum, atomization and the like. The proportions of agglomeration binder and of zeolites used are typically those of the prior art, that is to say between 5 parts and 30 parts by weight of binder per 95 parts to 70 parts by weight of zeolite.

The zeolite adsorbent material that can be used in the context of the present invention, whether it is in the form of balls, extruded pieces or the like, generally has a volume mean diameter, or a mean length (largest dimension when it is not spherical), of less than or equal to 7 mm, preferably between 0.05 mm and 7 mm, more preferably between 0.2 mm and 5 mm and more preferentially between 0.2 mm and 2.5 mm.

The zeolite adsorbent materials that are of use in the context of the present invention also have mechanical properties that are most particularly suitable for the applications to which they are intended, that is to say:

either a bulk crush strength (BCS) in a bed, measured according to standard ASTM 7084-04, of between 0.5 MPa and 3 MPa, preferably between 0.75 MPa and 2.5 MPa, for a material having a volume mean diameter (D50) or a length (largest dimension when the material is not spherical), of less than 1 mm, limits included, or a single pellet crush strength, measured according to standards ASTM D 4179 (2011) and ASTM D 6175 (2013), of between 0.5 daN and 30 daN, preferably between 1 daN and 20 daN, for a material having a volume mean diameter (D50) or a length (largest dimension when the material is not spherical), greater than or equal to 1 mm, limits included.

According to another preferred embodiment, the use according to the invention uses at least one zeolite adsorbent material having a high volumetric adsorption capacity, that is to say a volumetric micropore volume expressed in $cm^3 \cdot cm^{-3}$ of adsorbent material at least 95% exchanged with sodium, said micropore volumetric volume being greater than $0.10 \ cm^3 \cdot cm^{-3}$, preferably greater than $0.12 \ cm^3 \cdot cm^{-3}$, more preferably greater than $0.15 \ cm^3 \cdot cm^{-3}$, more preferably greater than $0.16 \ cm^3 \cdot cm^{-3}$, more preferably greater than $0.18 \ cm^3 \cdot cm^{-3}$, entirely preferably greater than $0.20 \ cm^3 \cdot cm^{-3}$.

According to yet another embodiment, the use according to the invention preferably uses at least one zeolite adsorbent material having a loss on ignition, measured at 950° C. according to standard NF EN 196-2, of between 0% et 5%, preferably between 0% and 3% by weight.

In particular, the present invention relates to the use of at least one zeolite adsorbent material as has just been defined, for purifying natural gas, in particular for removing the impurities and preferably for removing the carbon dioxide and/or the mercaptans, present in natural gas, and in particular according to pressure and/or temperature swing adsorption (PSA or TSA or PTSA) processes, preferably TSA or PISA processes. It is in particular preferred to use, for these types of applications, the adsorbent materials comprising an FAU zeolite, which is preferably mesoporous, of the type chosen from NaX and CaX, and mixtures thereof.

For these types of applications, preference is given to a zeolite adsorbent material of which the volume mean diameter (or the longest length) is between 0.3 mm and 7.0 mm, preferably between 0.8 mm and 5.0 mm, and more preferably between 2.0 mm and 5.0 mm, limits included.

According to another embodiment, the present invention relates to the use of at least one zeolite adsorbent material as has just been defined, for the noncryogenic separation of industrial gases and of gases in the air, and in particular for nitrogen adsorption in the separation of gas from the air, in particular for the enrichment of oxygen in the air. This use is most particularly suitable in pressure swing adsorption (PSA) devices according to very short cycles (typically between 0.1 second and 10 seconds, preferably between 0.1 second and 5 seconds), and in particular in oxygen concentrators for respiratory assistance, as described for example in application WO 2008/152319.

In the case of the use according to the invention for the noncryogenic separation of industrial gases and of gases in the air, these processes are well known from the prior art, and in particular from document EP 0 893 157 which describes, generally, gas separation/purification processes by means of zeolite adsorbents.

For the applications of noncryogenic separation of industrial gases and of gases in the air and preferably of nitrogen separation for oxygen enrichment, preference is also given to the zeolite adsorbent material comprising at least one FAU zeolite, which is preferably mesoporous, of the type chosen from NaX, LiX, CaX, LiCaX, NaLSX, LiLSX, CaLSX, LiCaLSX, and mixtures of two or more of them, said zeolite adsorbent material comprising at least one alkali or alkaline-earth metal chosen from sodium, calcium, lithium, and mixtures of two or three of them in any proportions, the contents of which expressed as oxides are as defined above.

More particularly, the use described above is most particularly suitable for nitrogen separation for oxygen enrichment, and most particularly for use in oxygen concentrators for respiratory assistance. In these cases, it is preferred to use at least one zeolite adsorbent material comprising sodium, calcium and/or lithium, alone or as a mixture, and it is most particularly preferred, for these types of applications, to use a zeolite adsorbent material comprising at least one FAU zeolite, which is preferably mesoporous, of the type chosen from NaX, LiX, CaX, LiCaX, NaLSX, LiLSX, CaLSX and LiCaLSX, and mixtures of two or more of them, preferably from CaLSX, LiLSX and LiCaLSX, more preferably at least one LiLSX zeolite, preferably mesoporous LiLSX zeolite.

For applications for the separation of industrial gases and of gases in the air in general, a zeolite adsorbent material in the form of balls of which the mean volume diameter is between 0.05 mm and 5 mm, preferably between 0.05 mm and 3.0 mm, more preferably between 0.05 mm and 2.0 mm, is preferred.

For specific applications of oxygen enrichment of air, for example oxygen concentrators for respiratory assistance, a zeolite adsorbent material in the form of balls of which the mean volume diameter is between 0.05 mm and 1 mm, preferably between 0.1 mm and 0.7 mm, more preferably between 0.3 mm and 0.6 mm, is preferred.

According to another embodiment, the invention relates to the use of at least one zeolite adsorbent material as has just been defined, for the purification of syngas. An example of a process for purifying syngas is described in patent EP 1 312 406. The syngases targeted here are in particular syngases that are based on hydrogen and carbon monoxide and/or on hydrogen and nitrogen, and more particularly mixtures of hydrogen and carbon monoxide and/or of hydrogen and nitrogen, these syngases possibly also containing, or being polluted with, carbon dioxide and one or more possible other impurities, for instance, and in a nonlimiting manner, one or more impurities chosen from nitrogen, carbon monoxide, oxygen, ammonia, hydrocarbons and oxygen-comprising derivatives, in particular alkanes, in particular methane, alcohols, in particular methanol, and others.

The use according to the present invention is thus most particularly suitable for removing nitrogen, carbon monoxide, carbon dioxide, methane, and other impurities, preferably by pressure swing adsorption (PSA) processes, for hydrogen production. For these types of applications, adsorbent materials comprising an FAU zeolite, which is preferably mesoporous, of the type chosen from NaX, LiX, LiLSX, CaX, CaLSX, LiCaX and LiCaLSX, preferably chosen from NaX, NaLSX and LiCaLSX, and mixtures of two or more of them, are preferred.

For these types of applications, preference is given to a zeolite adsorbent material of which the volume mean diameter (or the longest length) is between 0.3 mm and 7 mm, preferably between 0.8 mm and 5.0 mm, and more preferably between 1.0 mm and 3.0 mm, limits included.

According to yet another embodiment, the invention also relates to the use of at least one zeolite adsorbent material as has just been defined, for the purification of air of air separation units (ASUs), in particular for removing hydrocarbons, carbon dioxide and nitrogen oxides, upstream of cryogenic distillation units. These types of applications, preferably carried out in PSA, TSA or PTSA processes, and preferably TSA or PTSA processes, zeolite adsorbent materials comprising an FAU zeolite, which is preferably mesoporous, of the type chosen from NaX, NaLSX, CaX and CaLSX, and mixtures of two or more of them, are preferred.

For these types of applications, preference is given to a zeolite adsorbent material of which the volume mean diameter (or the longest length) is between 0.3 mm and 7.0 mm, and more preferably between 0.5 mm and 5.0 mm, limits included.

According to another aspect, the invention relates to a zeolite adsorbent material having:
- an Si/Al ratio of said adsorbent, such that 1≤Si/Al<2.5, preferably 1≤Si/Al≤2, more preferably 1≤Si/Al≤1.8, and more preferably between 1≤Si/Al≤1.6,
- a mesopore volume of between 0.08 $cm^3 \cdot g^{-1}$ and 0.25 $cm^3 \cdot g^{-1}$, preferably between 0.08 $cm^3 \cdot g^{-1}$ and 0.22 $cm^3 \cdot g^{-1}$, and more preferably between 0.09 $cm^3 \cdot g^{-1}$ and 0.20 $cm^3 \cdot g^{-1}$, more preferably between 0.10 $cm^3 \cdot g^{-1}$ and 0.20 $cm^3 \cdot g^{-1}$, limits included,
- of ratio (Vmicro−Vmeso)/Vmicro between −0.5 and 1.0, limits not included, preferably −0.1 and 0.9, limits not included, preferably 0 and 0.9, limits not included, more preferably between 0.2 and 0.8, limits not included, more preferably between 0.4 and 0.8, limits not included, preferably between 0.6 and 0.8, limits not included, wherein the Vmicro is measured by the Dubinin-Raduskevitch method and the Vmeso is measured by the BJH method, and
- a non-zeolite phase (PNZ) content such that 0<PNZ≤30%, preferably 3%≤PNZ≤25%, more preferably 3%≤PNZ≤20%, advantageously 5%≤PNZ≤20%, even better still 7%≤PNZ≤18%, measured by XRD, by weight relative to the total weight of the zeolite adsorbent material, all of the measurements being carried out on the zeolite adsorbent material at least 95% exchanged with sodium.

The zeolite adsorbent material of the invention as has just been defined is a novel material in that it results from the agglomeration, with a binder as described below, of at least one mesoporous FAU zeolite, where the term "mesoporous", already previously defined, denotes a zeolite which has, together with the microporosity inherent in the structure of the zeolite, internal cavities of nanometric size (mesoporosity), easily identifiable by observation using a transmission electron microscope (TEM), as described for example in U.S. Pat. No. 7,785,563.

More specifically, the zeolite adsorbent material comprises at least one mesoporous FAU zeolite, that is to say a zeolite having an external surface area, defined by the t-plot method described below, of between 40 $m^2 \cdot g^{-1}$ and 400 $m^2 \cdot g^{-1}$, preferably between 60 $m^2 \cdot g^{-1}$ and 200 $m^2 \cdot g^{-1}$, limits included.

In addition, the zeolite adsorbent material according to the invention comprises at least one metal chosen from lithium, sodium and calcium, and mixtures of two or more of these metals, preferably two metals chosen from lithium, sodium and calcium, preferably sodium and lithium or sodium and calcium or sodium, lithium and calcium. The zeolite adsorbent materials in which the barium oxide content is less than 0.5%, preferably less than 0.3%, more preferably less than 0.1%, by weight relative to the total weight of the material, are also preferred.

These characteristics make the zeolite adsorbent material according to the invention particularly suitable for gas treatments, as was described above in the present description.

The zeolite adsorbent material according to the invention can be in all the forms known to those skilled in the art, and preferably in simple geometric forms, that is to say in granular forms, for example of ball or rod type, that is to say in spherical or cylindrical forms, respectively. Such simple forms are most particularly suitable since they are easy to process, in particular because of their shapes and their sizes that are compatible with existing technologies. In addition, these simple forms mean that the processes used consume low amounts of energy, since the zeolite adsorbent material generates few pressure drops, and has improved transfer properties.

The zeolite adsorbent material according to the invention can be prepared according to any method known to those skilled in the art, and in particular, and preferably, using the process for preparing mesoporous FAU as described for example by W. Schwieger (*Angew. Chem. Int. Ed.*, (2012), 51, 1962-1965) and by agglomerating the crystals obtained with at least one organic or mineral binder, preferably mineral binder, more preferably a binder chosen from zeolitizable or non-zeolitizable clays, and in particular from kaolins, kaolinites, nacrites, dickites, halloysites, attapulgites, sepiolites, montmorillonites, bentonites, illites and metakaolins, and also mixtures of two or more of these clays, in any proportions.

The agglomeration and the forming can be carried out according to all of the techniques known to those skilled in the art, such as extrusion, compacting, agglomeration on a granulating plate or granulating drum, atomization and the like. These various techniques have the advantage of allowing the preparation of adsorbent materials according to the invention which have the sizes and shapes previously described and are most particularly suitable for gas treatments.

The proportions of agglomeration binder (for example clays, as indicated above) and of zeolite(s) used for the preparation are typically those of the prior art, and vary according to the desired PNZ content and the degree of zeolitization of the binder. These proportions can be easily calculated by those skilled in the art specializing in the synthesis of zeolite agglomerates.

The agglomerates of the zeolite adsorbent materials, whether they are in the form of balls, extruded pieces or the like, generally have a volume mean diameter, or a mean length (largest dimension when they are not spherical), of less than or equal to 7 mm, preferably between 0.05 mm and 7 mm, more preferably between 0.2 mm and 5 mm and more preferentially between 0.2 mm and 2.5 mm.

The process for preparing the zeolite adsorbent materials according to the invention is readily adaptable from the preparation processes known to those skilled in the art, as already indicated, the use of at least one mesoporous FAU zeolite not substantially modifying these known processes, which means that the preparation process is a process that is easy, rapid and economical to implement and thus easily industrializable with a minimum of steps.

The zeolite adsorbent material of the invention preferably comprises at the same time macropores, mesopores and micropores. The term "macropores" is intended to mean pores of which the opening is greater than 50 nm, preferably between 50 nm and 400 nm. The term "mesopores" is intended to mean pores of which the opening is between 2 nm and 50 nm, limits not included. The term "micropores" is intended to mean pores of which the opening is less than 2 nm.

According to one preferred embodiment, the zeolite adsorbent material according to the present invention has a micropore volume (Dubinin-Raduskevitch volume), expressed in $cm^3$ per gram of zeolite adsorbent material, of between 0.210 $cm^3 \cdot g^{-1}$ and 0.360 $cm^3 \cdot g^{-1}$, preferably between 0.230 $cm^3 \cdot g^{-1}$ and 0.350 $cm^3 \cdot g^{-1}$, more preferably between 0.240 $cm^3 \cdot g^{-1}$ and 0.350 $cm^3 \cdot g^{-1}$, advantageously between 0.250 $cm^3 \cdot g^{-1}$ and 0.350 $cm^3 \cdot g^{-1}$, said micropore volume being measured on the zeolite adsorbent material at least 95% exchanged with sodium The total volume of the macropores and mesopores of the zeolite adsorbent materials according to the invention, measured by mercury intrusion, is advantageously between 0.15 $cm^3 \cdot g^{-1}$ and 0.5 $cm^3 \cdot g^{-1}$, preferably between 0.20 $cm^3 \cdot g^{-1}$ and 0.40 $cm^3 \cdot g^{-1}$ and very preferably between 0.20 $cm^3 \cdot g^{-1}$ and 0.35 $cm^3 \cdot g^{-1}$, the measurements being carried out on the adsorbent material at least 95% exchanged with sodium.

The volume fraction of the macropores of the zeolite adsorbent material is preferably between 0.2 and 1.0 of the total volume of the macropores and mesopores, very preferably between 0.4 and 0.8 and even more preferably between 0.45 and 0.65, limits included, the measurements being carried out on the zeolite adsorbent material at least 95% exchanged with sodium.

The size of the FAU zeolite crystals used to prepare the zeolite adsorbent material of the invention and also the size of the FAU zeolite elements in the zeolite adsorbent material are measured by observation under a scanning electron microscope (SEM). Preferably, the mean diameter of the FAU zeolite crystals is between 0.1 µm and 20 µm, preferably between 0.5 µm and 20 µm, and more preferably between 0.5 µm and 10 µm. The SEM observation also makes it possible to confirm the presence of non-zeolite phase comprising for example residual binder (not converted during the optional zeolitization step) or any other amorphous phase in the agglomerates.

According to one preferred embodiment, the zeolite adsorbent material according to the invention has an external surface area, measured by nitrogen adsorption and expressed in $m^2$ per gram of adsorbent, greater than 20 $m^2 \cdot g^{-1}$, and preferably between 20 $m^2 \cdot g^{-1}$ and 300 $m^2 \cdot g^{-1}$, and more preferably between 30 $m^2 \cdot g^{-1}$ and 250 $m^2 \cdot g^{-1}$ and more preferably between 40 $m^2 \cdot g^{-1}$ and 200 $m^2 \cdot g^{-1}$, and most preferably between 50 $m^2 \cdot g^{-1}$ and 200 $m^2 \cdot g^{-1}$, the measurements being carried out on the zeolite adsorbent material at least 95% exchanged with sodium.

According to one preferred embodiment, the zeolite adsorbent material according to the invention has a high volumetric adsorption capacity, that is to say a volumetric micropore volume expressed in $cm^3 \cdot cm^{-3}$ of zeolite adsorbent material at least 95% exchanged with sodium, said volumetric micropore volume being greater than 0.10 $cm^3 \cdot cm^{-3}$, preferably greater than 0.12 $cm^3 \cdot cm^{-3}$, more preferably greater than 0.15 $cm^3 \cdot cm^{-3}$, more preferably greater than 0.16 $cm^3 \cdot cm^{-3}$, more preferably greater than 0.18 $cm^3 \cdot cm^{-3}$, entirely preferably greater than 0.20 $cm^3 \cdot cm^{-3}$.

According to one preferred embodiment, the zeolite adsorbent material according to the invention comprises at least one mesoporous FAU zeolite as defined above, said at least one zeolite having an Si/Al ratio such that 1≤Si/Al<1.5, preferably 1≤Si/Al≤1.4. According to a most particularly preferred aspect, the Si/Al ratio of said at least one mesoporous FAU zeolite is equal to 1.00+/−0.05, the measurements being carried out on the zeolite adsorbent material at least 95% exchanged with sodium.

According to yet another preferred embodiment, said zeolite adsorbent material comprises at least one cation chosen from the ions of groups IA, IIA, IIIA, IB, IIB and IIIB of the periodic table, the trivalent ions of the lanthanide or rare earth series, the zinc(II) ion, the silver(I) ion, the cupric (II) ion, the chromium(III) ion, the ferric (III) ion, the ammonium ion and/or the hydronium ion, the preferred ions being calcium, lithium, sodium, potassium, barium, cesium, strontium, zinc and rare-earth ions and more preferably sodium, calcium and lithium ions, as indicated above.

The metal contents of the zeolite adsorbent material according to the invention, expressed as oxides, preferably those previously indicated, and more particularly:
- the CaO content is between 0% and 20.5% by weight relative to the total weight of the zeolite adsorbent material, preferably between 3% and 20.5% by weight relative to the total weight of the zeolite adsorbent material, preferably between 7.5% and 20.5% by weight relative to the total weight of the zeolite adsorbent material, and preferably between 9% and 20.5% by weight relative to the total weight of the zeolite adsorbent material, limits included,
- the $Li_2O$ content is between 0% and 12% by weight relative to the total weight of the zeolite adsorbent material, preferably between 3% and 12% by weight relative to the total weight of the zeolite adsorbent material, preferably between 5% and 12% by weight relative to the total weight of the zeolite adsorbent material, and preferably between 6.5% and 12% by weight relative to the total weight of the adsorbent, limits included,
- the $Na_2O$ content is between 0% and 22% by weight relative to the total weight of the zeolite adsorbent material, preferably between 0% and 19% by weight relative to the total weight of the zeolite adsorbent material, preferably between 0% and 15% by weight relative to the total weight of the zeolite adsorbent material, preferably between 0% and 10% by weight relative to the total weight of the zeolite adsorbent material, and entirely preferably between 0% and 7% by weight relative to the total weight of the zeolite adsorbent material, advantageously between 0% and 2% by weight relative to the total weight of the zeolite adsorbent material, limits included,
- it being understood that the zeolite adsorbent material comprises at least one of the three metals chosen from lithium, sodium and calcium,
- said zeolite adsorbent material possibly also comprising at least one rare earth, chosen from lanthanides and actinides, preferably from lanthanides, in a content of generally between 0% and 10%, preferably between 0% and 7%,
- said zeolite adsorbent material possibly also comprising, in small amounts (% expressed as oxide, less than 5%, preferably less than 2%), one or more cations other than lithium, sodium and calcium, for example and preferably chosen from potassium, barium, strontium, cesium, transition metals such as silver, and the like.

As indicated above, the zeolite adsorbent materials in which the barium oxide content is less than 0.5%, preferably less than 0.3%, more preferably less than 0.1%, by weight relative to the total weight of the material, are also preferred.

According to a further preferred aspect, the zeolite adsorbent material according to the invention does not have a zeolite structure other than the FAU (faujasite) structure. The expression "does not have a zeolite structure other than the FAU structure" is intended to mean that an XRD (X-ray diffraction) analysis of the adsorbent material according to the invention does not make it possible to detect more than 5% by weight, preferably not more than 2% by weight, limits included, of zeolite structure other than a faujasite structure, relative to the total weight of the adsorbent material.

According to yet another preferred embodiment, the invention relates to a zeolite adsorbent material as defined above and having a total macropore and mesopore volume, measured by mercury intrusion, of between 0.15 $cm^3·g^{-1}$ and 0.5 $cm^3·g^{-1}$, and a macropore volume fraction of between 0.2 and 1 time said total macropore and mesopore volume, preferably between 0.4 and 0.8, limits included, the measurements being carried out on the adsorbent material at least 95% exchanged with sodium.

Characterization Techniques

The physical properties of the zeolite adsorbent materials are evaluated by the methods known to those skilled in the art, the main ones of which are recalled below.

Zeolite Crystal Particle Size:

The estimation of the number-average diameter of the FAU zeolite crystals contained in the zeolite adsorbent materials, and which are used for preparing said zeolite adsorbent material, is carried out by observation under a scanning electron microscope (SEM).

In order to estimate the size of the zeolite crystals on the samples, a set of images is taken at a magnification of at least 5000. The diameter of at least 200 crystals is then measured using dedicated software, for example the Smile View software published by LoGraMi. The accuracy is of the order of 3%.

Zeolite Adsorbent Particle Size

The volume mean diameter (or "volume-average diameter") of the zeolite adsorbent material of the process according to the invention is determined by analysis of the particle size distribution of a sample of adsorbent material by imaging according to standard ISO 13322-2:2006, using a conveyor belt that allows the sample to pass in front of the objective of the camera.

The volume-average diameter is then calculated from the particle size distribution by applying standard ISO 9276-2: 2001. In the present document, the name "volume-average diameter" or else "size" is used for the zeolite adsorbent materials. The accuracy is of the order of 0.01 mm for the size range of the adsorbent materials which may be used in the context of the present invention.

Chemical Analysis of the Zeolite Adsorbent Materials Si/Al Ratio and Degree of Exchange:

An elemental chemical analysis of a zeolite adsorbent material described above can be carried out according to various analytical techniques known to those skilled in the art. Among these techniques, mention may be made of the technique of chemical analysis by x-ray fluorescence as described in standard NF EN ISO 12677: 2011 on a wavelength-dispersive spectrometer (WDXRF), for example the Tiger S8 machine from the company Bruker.

X-ray fluorescence is a non-destructive spectral technique which exploits the photoluminescence of atoms in the x-ray range, to establish the elemental composition of a sample. Excitation of the atoms, generally with an x-ray beam or by electron bombardment, generates specific radiations after returning to the ground state of the atom. A measurement uncertainty of less than 0.4% by weight is conventionally obtained after calibration for each oxide.

Other methods of analysis are for example illustrated by the atomic absorption spectrometry (AAS) and inductively coupled plasma atomic emission spectrometry (ICP-AES) methods described in standards NF EN ISO 21587-3 or NF EN ISO 21079-3 on an apparatus of for example Perkin Elmer 4300DV type.

The x-ray fluorescence spectrum has the advantage of depending very little on the chemical combination of the element, which offers a precise determination, both quantitatively and qualitatively. After calibration for each oxide $SiO_2$ and $Al_2O_3$, and also the various oxides (such as those originating from the exchangeable cations, for example sodium), a measurement uncertainty of less than 0.4% by weight is conventionally obtained. The ICP-AES method is particularly suitable for measuring the lithium content which makes it possible to calculate the lithium oxide content.

Thus, the elemental chemical analyses described above make it possible to verify both the Si/Al ratio of the zeolite used within the zeolite adsorbent material and the Si/Al ratio of the zeolite adsorbent material. In the description of the present invention, the measurement uncertainty for the Si/Al ratio is ±5%. The measurement of the Si/Al ratio of the zeolite present in the adsorbent material can also be carried out by solid silicon nuclear magnetic resonance (NMR) spectroscopy.

The quality of the ion exchange is linked to the number of moles of the cation in question in the zeolite adsorbent material after exchange. More specifically, the degree of exchange with a given cation is estimated by evaluating the ratio between the number of moles of said cation and the number of moles of all of the exchangeable cations. The respective amounts of each of the cations are evaluated by chemical analysis of the corresponding cations. For example, the degree of exchange with the sodium ions is estimated by evaluating the ratio between the total number of $Na^+$ cations and the total number of exchangeable cations (for example $Ca^{2+}$, $K^+$, $Li^+$, $Ba^{2+}$, $Cs^+$, $Na^+$, etc. . . . ), the amount of each of the cations being evaluated by chemical analysis of the corresponding oxides ($Na_2O$, $CaO$, $K_2O$, $BaO$, $Li_2O$, $Cs_2O$, etc.). This method of calculation also takes into account the possible oxides present in the residual binder of the zeolite adsorbent material. However, the amount of such oxides is considered to be minor compared with the oxides originating from the cations of the exchangeable sites of the zeolite(s) of the zeolite adsorbent material according to the invention.

Macropore and Mesopore Volume

The macropore and mesopore volume are measured, on a sample at least 95% exchanged with sodium, by mercury intrusion porosimetry. A Micromeritics Autopore® 9500 mercury porosimeter is used to analyse the distribution of the pore volume contained in the macropores and in the mesopores.

The experimental method, described in the operating manual for the apparatus which refers to standard ASTM D4284-83, consists in placing a pre-weighed sample of zeolite adsorbent material to be measured (of known loss on ignition) in a porosimeter cell, then, after prior degassing (discharge pressure of 30 μmHg for at least 10 min), in filling the cell with mercury at a given pressure (0.0036 MPa), and then in applying an increasing pressure in steps up to 400 MPa in order to gradually cause the mercury to penetrate into the porous network of the sample.

In the present document, the macropore and mesopore volumes of the zeolite adsorbent materials, expressed in $cm^3 \cdot g^{-1}$, are thus measured by mercury intrusion and related to the weight of the sample in anhydrous equivalent, that is to say the weight of said material corrected for the loss on ignition.

Mechanical Strength of the Zeolite Adsorbent Materials:

The bulk crush strength in a bed of the zeolite adsorbent materials as described in the present invention is characterized according to standard ASTM 7084-04. The grain crush strengths are determined with a "grain crushing strength" apparatus sold by Vinci Technologies, according to standards ASTM D 4179 and D 6175.

Micropore Volume Measurement:

The micropore volume measurement is estimated by conventional methods such as Dubinin-Raduskevitch volume measurements (adsorption of liquid nitrogen at 77 K or of liquid argon at 87 K).

The Dubinin-Raduskevitch volume is determined from the gas, such as nitrogen or argon, adsorption isotherm measurement, at its liquefaction temperature, as a function of the pore openings of the zeolite: nitrogen will be chosen for FAU. Prior to the adsorption, the zeolite adsorbent material is degassed at between 300° C. and 450° C. for a time of between 9 hours and 16 hours, under vacuum ($P<6.7\times10^{-4}$ Pa). Measurement of the adsorption isotherms is then performed on a machine of ASAP 2020 type from Micromeritics, taking at least 35 measurement points at relative pressures of ratio P/P0 between 0.002 and 1. The micropore volume is determined according to Dubinin and Raduskevitch from the isotherm obtained, by applying standard ISO 15901-3 (2007). The micropore volume evaluated according to the Dubinin and Raduskevitch equation is expressed in $cm^3$ of liquid adsorbate per gram of zeolite adsorbent material. The measurement uncertainty is ±0.003 $cm^3 \cdot g^{-1}$, the measurements being carried out on the zeolite adsorbent material at least 95% exchanged with sodium.

Volumetric Micropore Volume Measurement:

The volumetric micropore volume is calculated from the micropore volume as defined above and by multiplying said micropore volume by the apparent density of said zeolite adsorbent material. The apparent density is measured as described in standard DIN 8948/7.6.

Loss on Ignition of the Zeolite Adsorbent Materials:

The loss on ignition is determined under an oxidizing atmosphere, by calcination of the sample in air at a temperature of 950° C.±25° C., as described in standard NF EN 196-2 (April 2006). The measurement standard deviation is less than 0.1%.

Qualitative and Quantitative Analysis by X-Ray Diffraction

The purity of the zeolites in the zeolite adsorbent materials is evaluated by x-ray diffraction analysis, known to those skilled in the art by the acronym XRD. This identification is carried out on a Bruker XRD apparatus.

This analysis makes it possible to identify the various zeolites present in the adsorbent material since each of the zeolites has a unique diffractogram defined by the positioning of the diffraction peaks and by their relative intensities.

The zeolite adsorbent materials are ground and then spread and leveled out on a sample holder by simple mechanical compression.

The conditions under which the diffractogram is acquired on the Bruker D5000 machine are as follows:

Cu tube used at 40 kV 30 mA;
slit size (divergent, scattering and analysis)=0.6 mm;
filter: Ni;
sample device rotating at: 15 rpm;
measuring range: 3°<2θ<50°;
increment: 0.02°;
counting time per increment: 2 seconds.

Interpretation of the diffractogram obtained is performed with the EVA software with identification of the zeolites using the ICDD PDF-2 release 2011 base.

The amount of the FAU zeolite fractions, by weight, is measured by XRD analysis; this method is also used to measure the amount of the zeolite fractions other than FAU. This analysis is performed on a Bruker brand machine, and the amount by weight of the zeolite fractions is then evaluated using the TOPAS software from the company Bruker.

Measurement of the External Surface Area ($m^2$/g) Via the "t-Plot" Method:

The "t-plot" calculation method exploits the adsorption isotherm data Q ads=f (P/P0) and makes it possible to calculate the micropore surface area. The external surface area may be deduced therefrom by determining the difference with the BET surface area which calculates the total pore surface area in $m^2/g$ (S BET=micropore surface area+ external surface area).

To calculate the micropore surface area via the t-plot method, the curve Q ads ($cm^3 \cdot g^{-1}$) is plotted as a function of t=thickness of the layer depending on the partial pressure P/P0 that would be formed on a reference non-porous material (t function of log (P/P0): Harkins-Jura equation applied: $[13.99/(0.034-\log(P/P0))]^0.5]$. In the interval t between 0.35 nm and 0.5 nm, a straight line may be plotted which defines an adsorbed intercept point Q, which makes it possible to calculate the micropore surface area. If the material is not microporous, the straight line passes through 0, the measurements being carried out on the zeolite adsorbent material at least 95% exchanged with sodium.

Mesopore Volume Measurement:

The measurement of the mesopore volume, on a sample at least 95% exchanged with sodium, is estimated by conventional methods such as the Barret-Joyner-Halenda volume measurements (adsorption of liquid nitrogen at 77 K).

The mesopore volume is determined from the gas, such as nitrogen, adsorption isotherm measurement, at its liquefaction temperature, as a function of the pore openings of the zeolite: nitrogen will be chosen for FAU. Prior to the adsorption, the zeolite adsorbent material is degassed at between 300° C. and 450° C. for a time of between 9 hours and 16 hours, under vacuum ($P<6.7\times10^{-4}$ Pa). Measurement of the adsorption isotherms is then performed on a machine of ASAP 2020 type from Micromeritics, taking at least 35 measurement points at relative pressures of ratio P/P0 between 0.002 and 1. The mesopore volume is determined according to Barret-Joyner-Halenda from the isotherm obtained, by applying standard ISO 15901-2 (2007). The mesopore volume evaluated according to the Barret-Joyner-Halenda equation is expressed in $cm^3$ of liquid adsorbate per gram of zeolite adsorbent material.

The following examples serve to illustrate the present invention without aiming to limit the scope thereof as defined by the appended claims.

EXAMPLE 1: PREPARATION OF A ZEOLITE ADSORBENT MATERIAL ACCORDING TO THE INVENTION

Step 1: Synthesis of Mesoporous LSX Zeolite Crystals Having an Si/Al Ratio Equal to 1.01 and an External Surface Area Equal to 95 $m^2 \cdot g^{-1}$ a) Preparation of the Growth Gel: Reactor Stirred with an Archimedean Screw at 250 rpm A growth gel is prepared in a 3 liter stainless-steel reactor equipped with a heating jacket, a temperature probe and a stirrer, by mixing an aluminate solution containing 300 g of sodium hydroxide (NaOH), 264 g of 85% potassium hydroxide, 169 g of alumina trihydrate ($Al_2O_3 \cdot 3H_2O$, containing 65.2% by weight of $Al_2O_3$) and 1200 g of water at 25° C. over 5 minutes, with a stirring speed of 250 rpm, with a silicate solution containing 490 g of sodium silicate, 29.4 g of NaOH and 470 g of water at 25° C.

The stoichiometry of the growth gel is as follows: 4.32 $Na_2O$/1.85 $K_2O$/$Al_2O_3$/2.0 $SiO_2$/114 $H_2O$. Homogenization of the growth gel is performed with stirring at 250 rpm for 15 minutes at 25° C.

b) Addition of the Nucleating Gel 11.6 g of nucleating gel (i.e. 0.4% by weight) of composition 12 $Na_2O$/$Al_2O_3$/10$SiO_2$/180 $H_2O$ prepared in the same manner as the growth gel, and which has matured for 1 hour at 40° C., is added to the growth gel, at 25° C. with stirring at 300 rpm. After 5 minutes of homogenization at 250 rpm, the stirring speed is reduced to 50 rpm and stirring is continued for 30 minutes.

c) Introduction of the Structuring Agent into the Reaction Medium 35.7 g of a solution of [3-(trimethoxysilyl)propyl]octadecyldimethylammonium chloride (TPOAC) at 60% in methanol (MeOH) are introduced into the reaction medium with a stirring speed of 250 rpm for 5 minutes (TPOAC/$Al_2O_3$ mole ratio=0.04). A maturation step is then performed at 30° C. for 20 hour at 50 rpm before starting the crystallization.

d) 2-Step Crystallization

The stirring speed is maintained at 50 rpm and then an increase in the set point of the reactor jacket is programmed at 63° C. in a linear manner so that the reaction medium increases in temperature to 60° C. over the course of 5 hours, followed by a stationary temperature phase for 21 hours at 60° C.; the set point of the reactor jacket is then set at 102° C. so that the reaction medium increases in temperature to 95° C. over the course of 60 minutes. After 3 hours at a stationary temperature phase of 95° C., the reaction medium is cooled by circulating cold water through the jacket to stop the crystallization.

e) Filtration/Washing

The solids are recovered on a sinter and then washed with deionized water to neutral pH.

f) Drying/Calcination

In order to characterize the product, drying is performed in an oven at 90° C. for 8 hours.

The calcination of the dried product, required in order to free both the microporosity (water) and the mesoporosity by removing the structuring agent, is carried out by degassing under vacuum with a gradual increase in steps of 50° C. up to 400° C. for a period of between 9 hours and 16 hours, under vacuum ($P<6.7\times10^{-4}$ Pa).

The micropore volume and the external surface area, measured according to the t-plot method from the nitrogen adsorption isotherm at 77 K after degassing under vacuum at 400° C. for 10 hours, are respectively 0.215 $cm^3 \cdot g^{-1}$ and 95 $m^2 \cdot g^{-1}$. The number-average diameter of the crystals is 6 μm. The mesopore diameters calculated from the nitrogen adsorption isotherm by the DFT method are between 5 nm and 10 nm. The XR diffractogram corresponds to a pure faujasite (FAU) structure, no LTA zeolite is detected. The Si/Al mole ratio of the mesoporous LSX determined by X-ray fluorescence is equal to 1.01.

FIG. 1 shows an image obtained by transmission electron microscopy (TEM) of the zeolite thus synthesized.

Step 2: Preparation of Mesoporous LSX Zeolite Agglomerates

In the subsequent text, the weights given are expressed in anhydrous equivalent.

A homogeneous mixture consisting of 1700 g of mesoporous LSX zeolite crystals obtained in step 1, of 300 g of Zeoclay® attapulgite, sold by CECA, and also of the amount of water such that the loss on ignition of the paste before forming is 35%, is prepared. The paste thus prepared is used on a granulating plate in order to prepare balls of agglomerated zeolite adsorbent material. Selection by sieving of the balls obtained is carried out so as to collect balls having a diameter of between 0.3 and 0.8 mm and a volume-average diameter equal to 0.55 mm.

The balls are dried overnight in a ventilated oven at 80° C. They are then calcined for 2 h at 550° C. under nitrogen flushing, then 2 h at 550° C. under flushing with decarbonated dry air.

Step 3: Lithium Exchange and Activation of the Mesoporous LSX Zeolite Agglomerates Five successive exchanges are carried out by means of 1 M lithium chloride solutions, in a proportion of 20 ml·g$^{-1}$ of solid. Each exchange is continued for 4 h at 100° C., and intermediate washes are performed, making it possible to remove the excess salt at each step. In the final step, four washes are carried out at ambient temperature, in a proportion of 20 ml·g$^{-1}$.

The balls are dried overnight in a ventilated oven at 80° C. They are then activated for 2 h at 550° C. under nitrogen flushing.

The lithium oxide Li$_2$O content, determined by ICP-AES, is 8.9% by weight relative to the total weight of the zeolite adsorbent material. The volume-average diameter of the balls is 0.55 mm. The bulk crush strength in a bed of the lithium-exchanged mesoporous LSX zeolite balls is 2.6 daN.

Step 4: Characterizations

In order to characterize the zeolite adsorbent material, it is at least 95% exchanged with sodium in the following way: the zeolite adsorbent material is introduced into a NaCl solution containing 1 mol of NaCl per liter, at 90° C., for 3 h, with a liquid-to-solid ratio of 10 ml·g$^{-1}$. The operation is repeated 4 times. Between each exchange, the solids are successively washed four times by immersing them in water in a proportion of 20 ml·g$^{-1}$ in order to remove the excess salt, and then dried for 12 h at 80° C. under air, before being analyzed by x-ray fluorescence. The weight percentage of sodium oxide of the zeolite adsorbent material is equal to 18.2% with a stability at less than 1% between exchange operations 3 and 4. The balls are dried overnight in a ventilated oven at 80° C. They are then activated for 2 h at 550° C. under nitrogen flushing.

The external surface area is equal to 99 m$^2$·g$^{-1}$ of adsorbent, the micropore volume is 0.264 cm$^3$·g$^{-1}$ of sodium-exchanged adsorbent. The volumetric micropore volume is 0.150 cm$^3$ per cm$^3$ of sodium-exchanged zeolite adsorbent material. The mesopore volume is equal to 0.165 cm$^3$·g$^{-1}$ of sodium-exchanged adsorbent. The total macropore and mesopore volume, measured by mercury intrusion, is 0.42 cm$^3$·g$^{-1}$ of sodium-exchanged adsorbent.

The Si/Al atomic ratio of the adsorbent is 1.25. The Si/Al ratio of the zeolite present in the adsorbent zeolite material, which is equal to 1.01, is determined by solid silicon 29 NMR.

The content of non-zeolite phase (PNZ), measured by XRD and expressed by weight relative to the total weight of the adsorbent, is 15.3%.

EXAMPLE 2: COMPARATIVE ZEOLITE ADSORBENT MATERIAL

Siliporite® Nitroxy® SXSDM sieve from CECA is a material based on LiLSX zeolite agglomerated with attapulgite. The volumetric mean diameter of the balls is equal to 0.55 mm. The content of lithium oxide Li$_2$O, measured by ICP-AES, is 9.2% by weight relative to the total weight of sieve.

As in step 4 of example 1, sodium exchanges are carried out so as to obtain a solid at least 95% exchanged with sodium. As previously, this result is obtained with 4 consecutive exchanges.

The weight percentage of sodium oxide of the zeolite adsorbent material, obtained by x-ray fluorescence, is equal to 18.4% with a stability at less than 1% between exchange operations 3 and 4. The balls are dried overnight in a ventilated oven at 80° C. They are then activated for 2 h at 550° C. under nitrogen flushing.

The external surface area is equal to 31 m$^2$·g$^{-1}$ of adsorbent, the micropore volume is 0.265 cm$^3$·g$^{-1}$ of sodium-exchanged adsorbent. The volumetric micropore volume is 0.172 cm$^3$ per cm$^3$ of sodium-exchanged zeolite adsorbent material. The mesopore volume is equal to 0.07 cm$^3$·g$^{-1}$ of sodium-exchanged adsorbent. The total macropore and mesopore volume, measured by mercury intrusion, is 0.31 cm$^3$·g$^{-1}$ of sodium-exchanged adsorbent.

The Si/Al atomic ratio of the adsorbent is 1.23. The content of non-zeolite phase (PNZ), measured by XRD and expressed by weight relative to the total weight of the adsorbent, is 15.3%.

EXAMPLE 3

N$_2$/O$_2$ Separation Tests on a Fixed Bed of Adsorbant with Pressure Swing Adsorption An N$_2$/O$_2$ separation test is carried out by adsorption in a single column according to a principle presented in E. Alpay et al. (ibid.).

Figure 2:
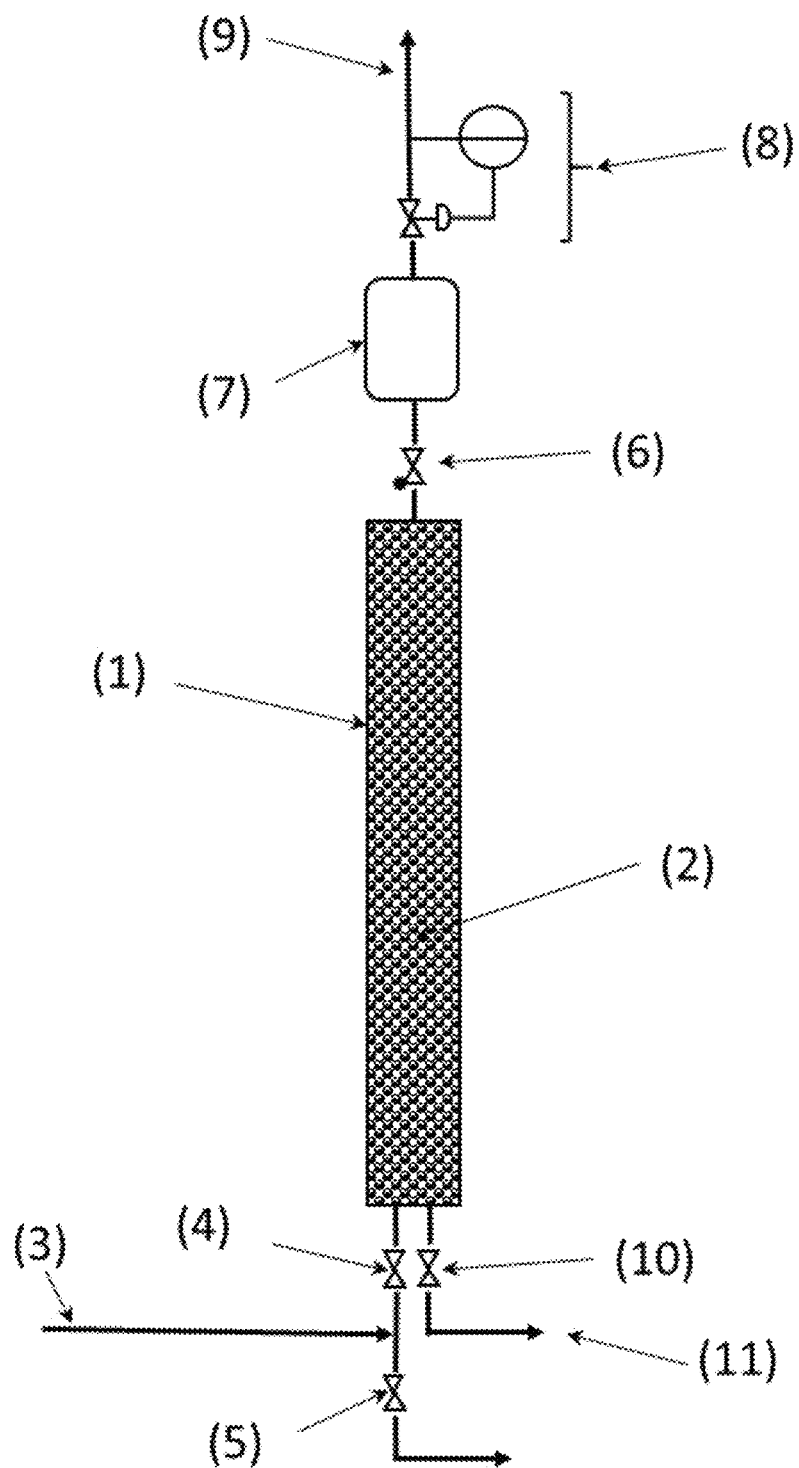
FIG. 2 is a schematic diagram of an embodiment of the invention.

FIG. 2 describes the assembly produced. A column (1) of internal diameter equal to 27.5 mm and of internal height equal to 600 mm, filled with zeolite adsorbent material (2), is fed with dry air (3) intermittently by means of a valve (4). The time for feeding the column (1) with the stream (3) is called adsorption time. When the column (1) is not fed with dry air, the stream (3) is discharged into the atmosphere by the valve (5). The zeolite adsorbent material preferentially absorbs nitrogen, so that an oxygen-enriched air leaves the column via the non-return valve (6), to a buffering tank (7). A regulating valve (8) continuously delivers the gas at outlet (9) at a constant flow rate fixed at 1 NL·min$^{-1}$.

When the column (1) is not fed, that is to say when the valve (4) is closed and the valve (5) is open, the column (1) is depressurized by the valve (10) to the atmosphere (11), for a period called the desorption time. The adsorption and desorption phases follow on from one another. The durations of these phases are fixed from one cycle to the other and they are adjustable. Table 1 indicates the respective state of the valves as a function of the adsorption and desorption phases.

TABLE 1

| Adsorption phase | Desorption phase |
| --- | --- |
| Valve (4) open | Valve (4) closed |
| Valve (5) closed | Valve (5) open |
| Valve (10) closed | Valve (10) open |

The tests are carried out successively with the zeolite adsorbent materials of example 1 (according to the invention) and of example 2 (comparative). The column is loaded at constant volume, with respectively 204.5 g and 239.7 g of adsorbent materials. The pressure at the inlet is fixed at 280 kPa relative.

The outlet flow rate is fixed at 1 NL·min$^{-1}$. The adsorption time is fixed at 0.25 s. The desorption time is variable between 0.25 s and 1.25 s.

The oxygen concentration at outlet (9) is measured by means of a Servomex 570A oxygen analyzer.

Figure 3:
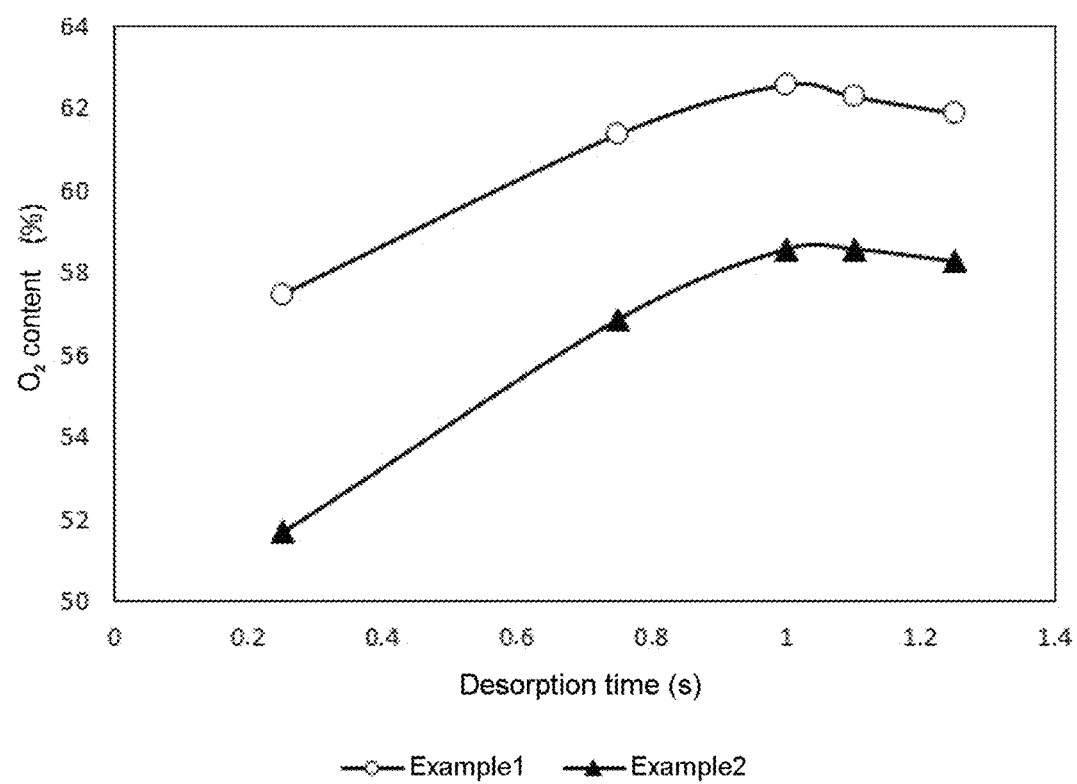
FIG. 3 is a graph showing the oxygen content of a gas stream as a function of desorption time for an embodiment of the invention, compared to a comparative example.

FIG. 3 shows the oxygen content of the stream produced at outlet (9) as a function of the desorption time fixed for the materials of example 1 and example 2. Despite a lower weight loaded into the column, the material of example 1 (according to the invention) proves to be much more efficient (in terms of oxygen content of the gas produced) than the solid of example 2 (comparative).

The invention claimed is:

1. A process for separation of oxygen gas components and nitrogen gas components from an oxygen/nitrogen gas mixture, wherein the process comprises:
    feeding the oxygen/nitrogen gas mixture to at least one FAU zeolite adsorbent material;
    separating the oxygen gas components present in the oxygen/nitrogen gas mixture by selective adsorption of the nitrogen gas components with the at least one FAU zeolite adsorbent material;
    recovering the separated oxygen gas components; and
    recovering the adsorbed nitrogen gas components by desorption,
    wherein the at least one FAU zeolite adsorbent material has physical properties that are measured on the FAU zeolite adsorbent material that has been at least 95% by weight exchanged with sodium, and wherein the physical properties comprise:
        an external surface area, measured by nitrogen adsorption and expressed in $m^2$ per gram of the at least one FAU zeolite adsorbent material, of greater than 20 $m^2 \cdot g^{-1}$;
        a non-zeolite phase (PNZ) content, such that $0<PNZ \leq 30\%$ as measured by X-ray diffraction (XRD) XRD (X ray diffraction), by weight relative to the total weight of the at least one FAU zeolite adsorbent material;
        a mesopore volume of between 0.08 $cm^3 \cdot g^{-1}$ and 0.25 $cm^3 \cdot g^{-1}$, limits included;
        a total volume of macropores and mesopores, measured by mercury intrusion, of between 0.15 $cm^3 \cdot g^{-1}$ and 0.5 $cm^3 \cdot g^{-1}$ and a macropore volume fraction of between 0.2 and 1; and
        an Si/Al atomic ratio of the at least one FAU zeolite adsorbent material of equal to 1 or between 1 and 2.5.

2. The process according to claim 1, wherein the at least one FAU zeolite adsorbent material has a (Vmicro Vmeso)/Vmicro ratio of between −0.5 and 1.0, limits not included, wherein Vmicro is the micropore volume measured by the Dubinin-Raduskevitch method and Vmeso is the mesopore volume measured by the Barrett-Joyner-Halenda (BJH) method, and wherein all of the measurements are carried out on the at least one FAU zeolite adsorbent material that has been at least 95% by weight exchanged with sodium.

3. The process according to claim 1, wherein the at least one FAU zeolite adsorbent material has a micropore volume as measured by the Dubinin-Raduskevitch method expressed in $cm^3$ per gram of the at least one FAU zeolite adsorbent material, of between 0.210 $cm^3 \cdot g^{-1}$ and 0.360 $cm^3 \cdot g^{-1}$ as measured on the at least one FAU zeolite adsorbent material that has been at least 95% by weight exchanged with sodium.

4. The process according to claim 1, wherein the at least one FAU zeolite adsorbent material has the Si/Al atomic ratio corresponding to the equation: $1 \leq Si/Al < 1.5$, wherein the Si/Al atomic ratio is measured by solid silicon 29 NMR.

5. The process according to claim 1, wherein the at least one FAU zeolite adsorbent material comprises at least one cation selected from the group consisting of ions of groups IA, IIA, IIIA, IB, IIB, and IIIB of the periodic table, trivalent ions of the lanthanide series of the periodic table, trivalent ions of the rare earth element series of the periodic table, zinc(II) ion, silver(I) ion, cupric (II) ion, chromium(III) ion, ferric (III) ion, ammonium ion, hydronium ion, calcium ion, lithium ion, sodium ion, potassium ion, barium ion, cesium ion, strontium ion, zinc ion, and mixtures thereof.

6. The process according to claim 1, wherein the at least one FAU adsorbent zeolite material comprises at least one alkali or alkaline-earth metal selected from the group consisting of sodium, calcium, lithium, and mixtures thereof, wherein the contents of which, expressed as oxides, are such that:
    the CaO content is between 0% and 20.5% by weight relative to the total weight of the FAU zeolite adsorbent material;
    the $Li_2O$ content is between 0% and 12% by weight relative to the total weight of the FAU zeolite adsorbent material; and
    the $Na_2O$ content is between 0% and 22% by weight relative to the total weight of the FAU zeolite adsorbent material,
    subject to the proviso that the at least one FAU zeolite adsorbent material comprises at least one of the three alkali or alkaline-earth metals selected from the group consisting of lithium, sodium and calcium.

7. The process according to claim 1, wherein the at least one FAU zeolite adsorbent material comprises at least one FAU zeolite, wherein the FAU zeolite is mesoporous, and is of a material selected from the group consisting of zeolites NaX, LiX, CaX, LiCaX, NaLSX, LiLSX, CaLSX, LiCaLSX, and mixtures thereof.

8. The process according to claim 1 wherein the process comprises pressure swing adsorption.

9. The process according to claim 8, wherein the at least one FAU zeolite adsorbent material comprises at least one FAU zeolite, wherein the FAU zeolite is mesoporous, and is of a material selected from the group consisting of zeolites CaLSX, LiLSX and LiCaLSX.

10. The process according to claim 1, wherein the oxygen/nitrogen gas mixture comprises air and at least one impurity, wherein the at least one impurity is selected from the group consisting of hydrocarbons, carbon dioxide, nitrogen oxides, and mixtures thereof.

11. The process according to claim 10, wherein the at least one FAU zeolite adsorbent material comprises at least one FAU zeolite, wherein the FAU zeolite is mesoporous, and of a material selected from the group consisting of zeolites NaX, NaLSX, CaX, CaLSX, and mixtures thereof.

12. The process according to claim 6, wherein the at least one FAU zeolite adsorbent material further comprises between 0% and 10% by weight of at least one rare earth element, wherein the rare earth element is selected from the group consisting of lanthanides, actinides, and mixtures thereof.

13. The process according to claim 6, wherein the FAU zeolite adsorbent material further comprises between 0% and 5% by weight, expressed as oxide, of one or more cations selected from the group consisting of transition metals, potassium, barium, strontium, cesium, and mixtures thereof.

14. The process according to claim 8, wherein the process comprises increasing oxygen concentration separated from air for respiratory assistance.

* * * * *

UNITED STATES PATENT AND TRADEMARK OFFICE
CERTIFICATE OF CORRECTION

PATENT NO. : 10,888,837 B2
APPLICATION NO. : 15/546847
DATED : January 12, 2021
INVENTOR(S) : Cécile Lutz et al.

Page 1 of 1

It is certified that error appears in the above-identified patent and that said Letters Patent is hereby corrected as shown below:

In the Claims

Column 21 In Claim 1, Line 36, ", limits included" should be deleted.

Column 21 In Claim 2, Line 45, "(Vmicro Vmeso)" should read --(Vmicro - Vmeso)--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*